Feb. 4, 1936.　　　　　E. H. KOCHER　　　　　2,029,325
COMPRESSION TUBING COUPLING
Filed Dec. 17, 1930　　　2 Sheets-Sheet 1
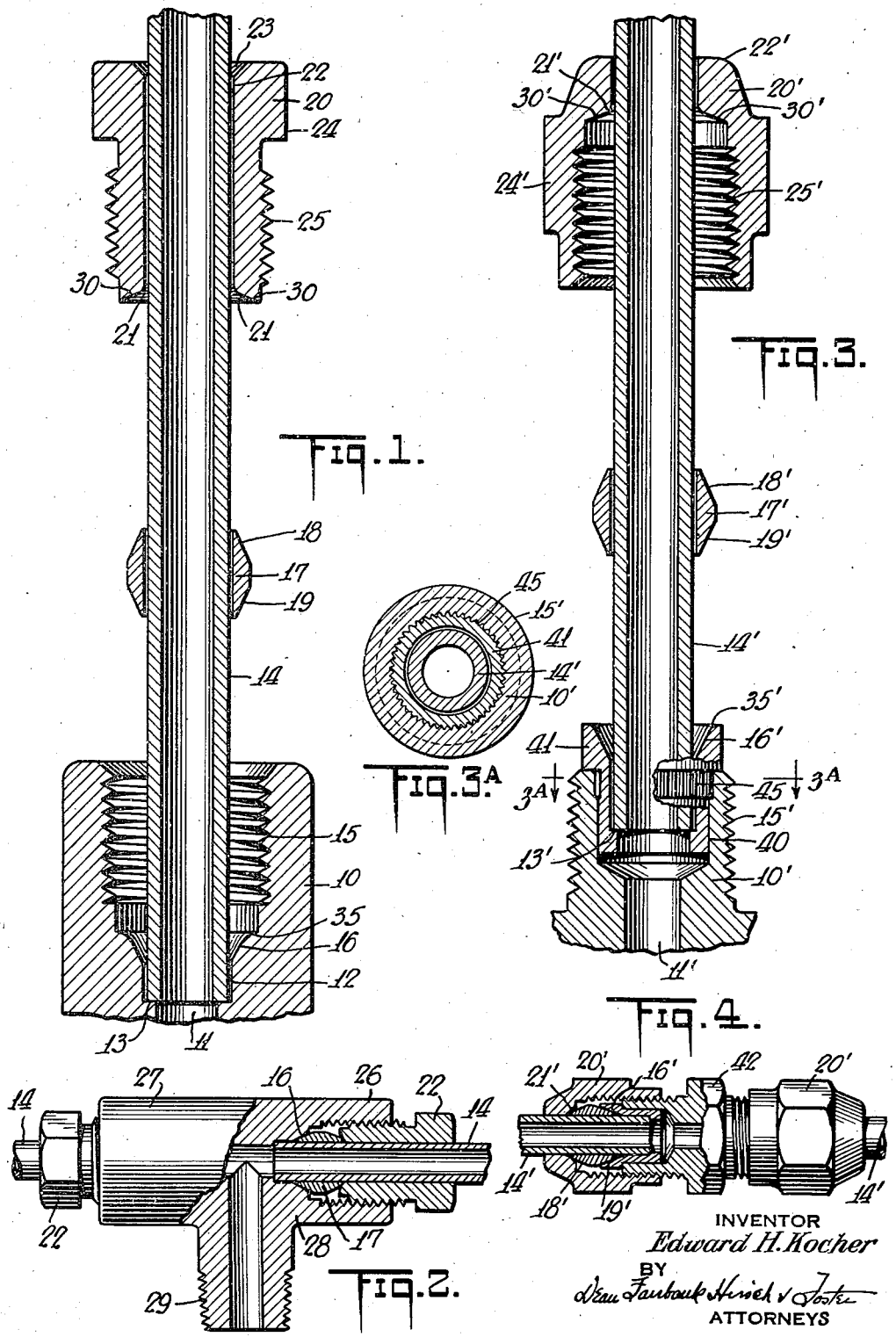
INVENTOR
Edward H. Kocher
BY
ATTORNEYS Feb. 4, 1936.  E. H. KOCHER  2,029,325
COMPRESSION TUBING COUPLING
Filed Dec. 17, 1930  2 Sheets-Sheet 2
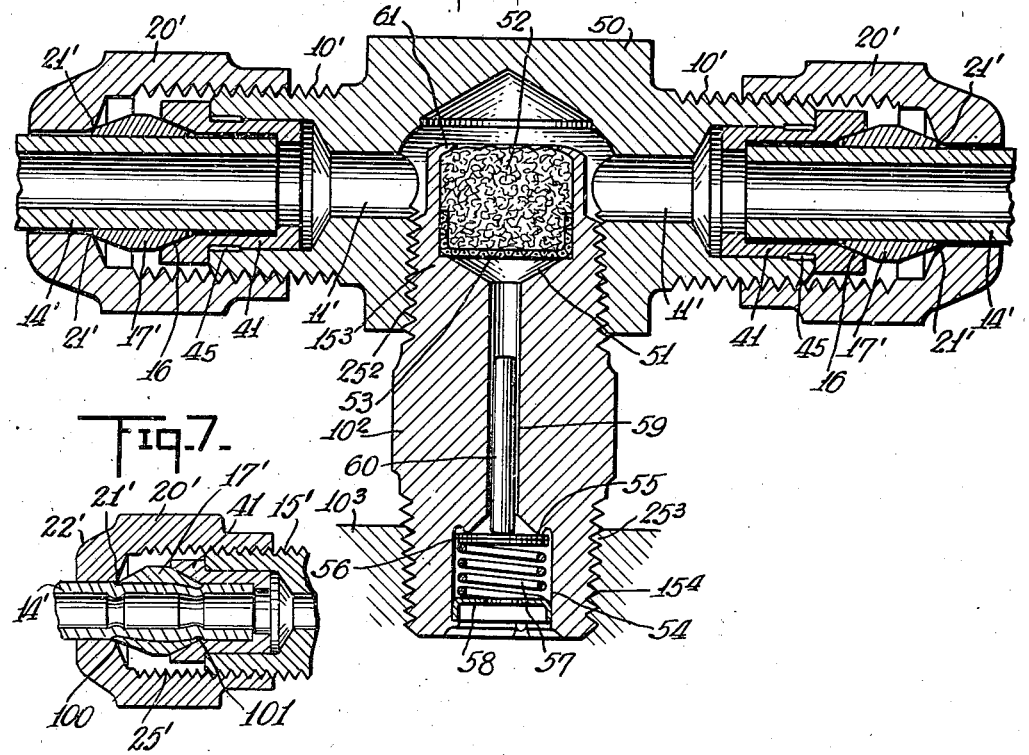
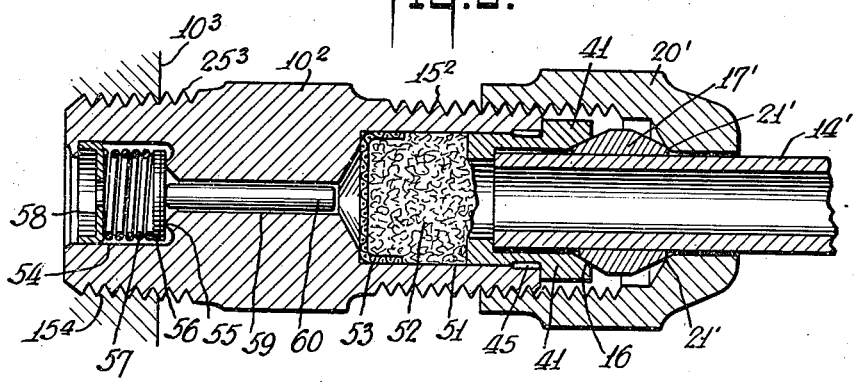
INVENTOR
Edward H. Kocher
BY
ATTORNEYS Patented Feb. 4, 1936

2,029,325

UNITED STATES PATENT OFFICE 2,029,325

COMPRESSION TUBING COUPLING

Edward H. Kocher, Boonton, N. J., assignor to Auto Research Corporation, a corporation of Delaware Application December 17, 1930, Serial No. 502,900

11 Claims. (Cl. 285—122)

This invention relates to pipe coupling arrangements and it is of general application to the coupling of pipe lengths to terminal structures or to each other.

Among the objects of the invention are to provide a coupling arrangement that consists of few parts which may be easily produced by automatic machinery and at small cost, which is self-aligning and has substantially no tendency to cock, which serves to hold the pipe rigidly in position during attachment thereof without twisting strain thereon, which effects a particularly secure and fluid-tight connection and which is capable of ready disconnection without mutilation.

A feature of the invention consists of the utilization of a tapered coupling sleeve or structure preferably with double and opposite tapers and of coacting clamping members, all of which encircle the pipe end and one of which is rigid with a juncton or mounting structure, serves to align the coupling sleeve or structure eliminating any tendency thereof to cock and grips it so as to prevent turning thereof, while the other is screwed into position to clamp the whole coupling structure together with the conduit or pipe end.

In a preferred embodiment the junction or mounting structure is provided with a contacting frustrated conical shelf or depression which is at substantially the same angle to the axis of the coupling arrangement as the cooperating face of the coupling sleeve and serves to form a wedging contact with the same over a substantial area surrounding or at a substantial radius away from the pipe or conduit. On the other hand, the turning mounting element, namely the coupling nut, cap or bushing, is so shaped as to avoid the possibility of wedging contact with the sleeve and is provided with a cooperating wedging or coupling edge which clamps or crimps the coupling sleeve over a very narrow area fairly close to the outer wall of the pipe or conduit.

In the case of a nipple mount, a steel reinforcing sleeve is preferably rigidly mounted therein to serve as the abutment for the tapered coupling device or sleeve and incidentally to constitute a stop for the end of the pipe.

In the application of the terminal construction to the connection of a pipe to a drip plug of the general construction shown in the prior Bijur Patent No. 1,632,772, the said reinforcing sleeve may also serve the function of clamping the periphery of the felt strainer.

In the drawings in which are shown one or more of the various possible embodiments of the several features of the invention:

Figs. 1 and 2 show one coupling arrangement, Fig. 1 being an enlarged, exploded view in longitudinal section of the arrangement, and Fig. 2 being a side view in fragmentary section, showing an application thereof;

Figs. 3, 3A and 4 show another embodiment, Fig. 3 being an enlarged, exploded view of the coupling arrangement, Fig. 3A being a transverse sectional view upon the line 3A—3A of Fig. 3, and Fig. 4 being a side view in fragmentary section, showing an application thereof; and Figs. 5 and 6 are views in longitudinal section of typical T and a terminal flow metering devices, respectively, showing the pipe coupling arrangements.

Fig. 7 is a view in longitudinal section of a coupling after the coupling nut has been screwed in position and the coupling sleeve has been deformed into the end of the tubing or into the pipe end.

In Fig. 1 the mounting structure 10, which may be part of a junction, a flow metering device or a bearing element, is provided with a bore 11, the outer portion of which is enlarged at 12 to form a shoulder 13, serving as an abutment for the pipe end 14. Communicating with the bore 11 is a machine tapped socket 15 which joins the enlargement by means of a sloping shelf, bevel, or depression 16, said shelf or bevel having approximately the form of a frustrated conical surface with an apical angle of about 55 degrees in the embodiment shown. Encircling the pipe end 14 and adapted to be inserted within the socket 15 is the coupling sleeve 17 which is provided with the tapered ends 18 and 19, each of which are approximately frustrated conical sections with apical angles of approximately 50 degrees, in the embodiment shown, the conical surface 19 serving to cooperate with the conical surface 16 and the conical surface 18 serving to contact with a clamping edge 21 of a coupling nut or bushing 20, now to be described.

The coupling bushing or nut 20 is provided with a central bore 22 which is somewhat larger in diameter than the external diameter of the pipe end 14; with a countersink 23 serving to enable more ready insertion of the pipe end; with a hexagonal head 24; with a machine threaded portion 25 adapted to cooperate with the tapped socket 15; and with a coupling edge or round 21 encircled by a frustrated conical depression 30 with an apical angle of about 140 degrees in the embodiment shown.

In Fig. 2 is shown the application of the coupling unit of Fig. 1 in assembled form, in section at 26 and side view at 27, respectively, to couple pipe ends 14 to a T head 28 which may be mounted in any satisfactory manner, as by a threaded stem 29. It will be noted that the coupling nut 22 contacts with the coupling sleeve 17 over a much smaller area and much closer to the axis of the mounting than does the mounting structure 28.

In Fig. 3 is shown another embodiment of the coupling structure in which the coupling nut instead of telescoping within a tapped socketed mounting structure 10 embraces and screws upon the outside of a threaded nipple 10' serving as a cap therefor, similarly functioning parts in Fig. 3 being designated by the same numerals as in Fig. 1 but primed. In this particular embodiment the bore 11' of the nipple 10' is enlarged adjacent the end of the nipple to form a socket 40 into which is force fitted a reinforcing bushing or thimble 41 carrying the inwardly projecting pipe abutment shoulder 13' at its inner end, and the conical clamping depression 16' at its outer end, said depression having, as in the case of the embodiment of Fig. 1, an angle of approximately 55 degrees.

Upon Fig. 4 is shown an application of the coupling arrangement of Fig. 3, in this instance shown as a coupling element 42 adapted to connect together the pipe ends 14', the left hand side showing the coupling arrangement in section and the right hand side showing a side view thereof. It will be noted here also that the coupling nut 20' contacts at its coupling edge or round 21' with but a small portion of the conical face 18' of the coupling sleeve, while the coupling surface 19' contacts with the clamping bevel 16' over a wider surface about the pipe 14 or at a greater effective radius.

In Figs. 5 and 6 is shown the utilization of the coupling arrangement of Fig. 3 for the attachment of pipe ends to drip plug fittings of lubricating systems, Fig. 5 showing a fitting of the T type while Fig. 6 shows a fitting of the straight or terminal type. In the case of the straight drip plug of Fig. 6, the coupling nut 20' screws upon the machine threaded nipple 15² which is integral with the drip plug body 10² thereof, while in the case of the T fitting of Fig. 5 the T head 50 screws upon the pipe threaded nipple 15³ of the drip plug body 10² by means of the pipe tapped socket 25². The other ends of the drip plug bodies 10² are provided with the pipe threaded portions 25³ which screw into the pipe tapped sockets 15⁴ in the bearing element or in the mounting structure 10³.

The drip plug structure of Fig. 6, as well as the stem of the structure of Fig. 5 are generally similar and have each an inlet socket 51 in which is positioned a felt strainer 52 having a backing cup 53 of wire mesh and an outlet socket 54, the inner end of which is conformed as a valve seat 55. A check valve 56 is pressed against said seat 55 by means of spring 57 retained within the socket 54 by the retainer 58.

In the longitudinal bore 59 between the inlet socket 51 and the outlet socket 54 is disposed a restriction pin 60, the diameter of which may be varied to change the rating of the fitting. In the embodiment of Fig. 5, the ends of the body are turned over at 61 to hold the felt 52 in position, while in the embodiment of Fig. 6 the felt is annularly held in position by means of the bevel-carrying thimble 41.

In all of the embodiments previously described, the apical angles of 50 degrees for the coupling sleeves 17, 55 degrees for the mounting bevel 16, and 140 degrees for the coupling nut bevel 30 are given by way of illustration, and it is possible to vary these angles so long as the tapered coupling sleeve 17 is accurately aligned and gripped with much greater force by the bevel 16 than by the turning edge or round 21 during screwing up of the coupling nut or bushing. The apical angles of the tapers 18 and 19 of the coupling sleeve 17 should always be substantially more than 36 to 40 degrees so that the coupling sleeve will not be so thin as not to offer any substantial resistance to crushing forces exerted by the coupling nut or bushing 20'. At the same time the apical angles should not be made substantially greater than about 60 degrees as otherwise the sleeve would be too blunt and it would be difficult to ensure satisfactory wedging against the rigid member and substantial prevention of wedging against the turning member. The cooperating bevel 16 on the fixed member in the preferred form has a slightly greater apical angle than the taper 19 so that there will be a little divergence between the outer edges of the taper 19 and 16 during the initial stages of the clamping operation, which divergence will be substantially or in a large part eliminated at the termination of the clamping operation. In certain cases it may also be desired to give the clamping bevel 16 a materially lesser angle than the sleeve taper 19 in which case the outer edge of the taper 19 would contact with a portion of the depression 16 substantially removed from the axis of the coupling.

The apical angle of the bevel 30 of the coupling nut or bushing 20 may be widely varied with the provision, however, that it preferably have a sufficiently great angle as to eliminate possibility of any wedging contact taking place between it and the bevel 18. As a result the round or edge 21 will solely serve to clamp and crimp the upper edge of the sleeve 17.

Although the coupling arrangement of the present invention may be widely applied to pipes of varying diameter, it finds a particular application to copper or brass tubing having $\frac{3}{32}$ inch or $\frac{5}{16}$ inch overall diameter with threads respectively, of $\frac{1}{16}$ inch to $\frac{3}{8}$ inch, the wall thickness in these cases being either about 0.025 inch or $\frac{1}{32}$ inch.

In the construction shown all parts, with the exception of the sleeve 41 and with the optional exception of the rigid member 10 and the junction 28, are made of brass. In certain cases, however, the coupling sleeve 17 may be made of a harder metal than brass, such as bronze, so as to decrease the amount of crimping and deformation of the sleeve during the clamping operation.

In assembling the mounting arrangement in any and all of the embodiments, the coupling nut 20 and the coupling sleeve 17 are slipped successively over the pipe end 14 and the pipe end is then bottomed upon the ledge 13 within the socket (in Fig. 3 after the thimble 41 has been press-fitted into the socket 40). In applying the coupling nut 20, the compression sleeve is forced axially inward into wedging engagement with the mounting bevel 16 and is aligned thereby. In this operation, the wedging engagement between the compression coupling sleeve 17 and the mounting bevel 16 causes said coupling sleeve to act substantially as a rigid part of the mounting structure 10. By reason of the large effective radius and area of the frustrated conical surface of contact 16—19 as compared to the relatively small effective radius and area of the surface of contact 18—21, the coupling sleeve will be held by greater frictional force or with greater security in respect to the mounting structure 10 than with respect to the rotating and advancing coupling nut 20. Accordingly, in the rotation and tightening of the coupling nut 20, the coupling sleeve 17 will stand still, so that there is no danger of exerting torque upon or twisting the pipe 14. In the last stages of the coupling operation, the turning bevel 21 of the coupling nut 20 will force the outer bevelled edge 18 of the compression coupling sleeve 17 inward to crimp the pipe end 14 and will also wedge the extreme end 19 of said coupling sleeve 17 into the space between the pipe end 14 and the bevel 16, crimping the pipe to a lesser degree and effecting a liquid-tight connection.

Whenever, for purpose of repair, it is desired to remove or take apart a terminal fitting or change a drip plug or the length of pipe leading to the same, it is merely necessary to unscrew the coupling nut 20 and to remove the pipe length 14, which can be readily separated from the mounting socket, the compression coupling sleeve 17 however, being securely and substantially irremovably clamped to said pipe. If the pipe length is to be replaced, a new compression sleeve need merely be provided on the substituted length of pipe and the same coupling nut may be reused.

In certain embodiments of the present invenition, instead of utilizing separate flow metering devices, as shown upon Figs. 5 and 6, the coupling sleeve 17 may be provided with a single taper and/or may be enlarged and provided with flow controlling and obstructing elements or the coupling sleeve may be bottomed in a conical depression in an element inserted or bottomed in a socket, or particularly when single tapered. upon a ledge on such an element, the present application constituting a continuation in part of my prior applications Serial No. 22,104 filed April 10, 1925, now Patent No. 1,943,326, and Serial No. 93,582 filed March 10, 1926, now Patent No. 1,862,482, in which modifications of this character are disclosed.

The steel sleeves 41, shown in Figs. 3, 4, 5 and 6 may be omitted and the depression 16' formed directly in the protruding nipples 10' if the metal material of the nipple 10' has sufficient strength or thickness to withstand the substantial outward wedging force exerted thereupon during the coupling operation, which in the case of brass should be a thickness of substantially 1/8 inch or greater. When there is a possibility that such steel sleeves 41 be subjected to a substantial twisting or turning strain as would be liable to result in their turning within the sockets 40, said sleeves may be knurled as at 45 (see particularly Figs. 3 and 3A).

To ensure a more satisfactory wedging operation between the conical depressions 16 and the tapers 19, the outer edges of said depressions 16 are preferably rounded, as indicated at 35 upon Fig. 1 and 35' on Fig. 3, said rounds in one embodiment being approximately 1/2 inch or 0.20 inch-0.25 inch. In Fig. 7 is shown the coupling arrangement of Figs. 3, 4, 5 and 6 after the coupling nut 20' has been tightened causing the tapered edges of the coupling sleeve 17' to be deformed, as indicated at 100 and 101, into the pipe 14'. It will be noted that the deformation 101 at the reinforcing thimble 41 will be of much greater depth or elongation than the deformation 100 at the nose 21' of the coupling nut 20'. It will be noted that the coupling sleeve wedges over a much greater area and at a much greater radius with the thimble 41 than it does with the coupling nut 20'.

By the expression "coupling nut" as utilized in the accompanying claims is included either the bushing 25, shown in Fig. 1, or the cap 25', shown in Fig. 3.

Subject matter shown and described in the present application but not claimed herein is shown and described in applications, Serial No. 22,104, filed April 10, 1925, now Patent No. 1,943,326; Serial No. 93,582, filed March 10, 1926, now Patent No. 1,862,482; and Serial No. 727,719, filed May 26, 1934, and the present application is a continuation in part of the first two mentioned applications. As indicated in application Serial No. 727,719, the sleeve and the coupling nut may be preassembled together as a single unit before the sleeve is crimped or deformed onto the tubing end.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

I claim:—

1. In a conduit system for a lubricating installation in combination, a mounting structure provided with a bored and threaded nipple, the outer portion of which bore is provided with a thimble carrying an inwardly projecting abutment shoulder and with a clamping conical depression, a pipe end inserted into said bore and abutting said shoulder, a tapped cap nut encircling said pipe end, provided interiorly with a bevelled portion and screwed upon said threaded nipple and a double tapered coupling sleeve structure clamped between said cap and said thimble within said tapped cap cavity, the coacting clamping surfaces being so constructed and arranged that the sleeve structure will resist turning with greater effect due to its contact with the mounting structure than it will tend to turn due to its conact with the rotated coupling cap, said nut and said sleeve structure being provided with highly outwardly diverging contacting surfaces, the divergence being of such magnitude that upon deformation of the sleeve structure such deformation will not result in the sleeve structure expanding to wedge at the divergent surface of the nut, the cooperating tapers, conical depression and the cap bevel having respectively angularities of about 50°, 55° and 140°, so that they contact closely adjacent to the pipe wall which they encircle and so that the contacting conical depression and cooperating taper diverge substantially less than the contacting cap bevel and cooperating taper.

2. In a coupling arrangement including a pair of coupling elements and a pipe end, one of said members being provided with a socket carrying structure with an abutment to receive and stop said pipe end and the other taking the form of an annular nut body encircling said pipe end, said elements being firmly attached to each other by a threaded connection and each of said members being provided with opposite internal tapered coupling surfaces, the combination therewith, of a sleeve structure having opposed tapered surfaces tapered to a thin edge, one tapered surface engaging the corresponding tapered surface on one of the coupling members and the thin edge of the other tapered surface contacting with a more abrupt tapered surface on the other coupling member, said nut and said sleeve structure being provided with highly outwardly diverging contacting surfaces, the divergence being of such magnitude that upon deformation of the sleeve structure such deformation will not result in the sleeve expanding to wedge at the divergent surface of the nut.

3. A tubing terminal arrangement comprising a mounting structure provided with a bore, the outer portion of which is provided with an abutment for the tubing end, with an outwardly divergent conical depression and a threaded portion, a tubing end abutting against said abutment and passing through said threaded portion and said conical depression, a threaded nut screwed to said threaded portion encircling said pipe end and having at its inner end a clamping edge and a double tapered coupling sleeve structure also encircling said pipe end clamped between said bushing and said abutment and contacting with said depression within the socket and with the clamping edge at the end of the bushing, such contacting surfaces being so constructed and arranged that the sleeve structure will resist turning with greater effect due to its contact with the mounting structure than it will tend to turn due to its contact with the rotated bushing.

4. A tubing terminal arrangement comprising a mounting structure provided with a bore, the outer portion of which is provided with an abutment for the end of the tubing with an outwardly divergent conical depression and with a threaded portion beyond said abutment, a tubing end against said abutment and passing through said threaded portion and said conical depression, a threaded nut member screwed to said threaded portion, encircling said tubing end and having a clamping edge and a double oppositely tapered coupling sleeve structure also encircling said tubing end clamped between said nut member and said structure and contacting with said depression within the socket and with the clamping edge at the end of the nut member, the effective radius of contact between the clamping edge and coupling sleeve structure being substantially less than the effective radius of contact between the conical depression and the coupling sleeve structure, the coupling sleeve structure being maintained substantially rigid with the mounting structure by wedging with the conical depression and being crimped against the tubing end during the assembly operation.

5. A tubing terminal arrangement comprising a mounting structure provided with a bore, the outer portion of which is provided with an abutment for the tubing end, with an outwardly divergent conical depression and a threaded portion, a tubing end abutting against said abutment and passing through said threaded portion and said conical depression, a threaded nut screwed to said threaded portion encircling said tubing end and having at its inner end a clamping edge and a double tapered coupling sleeve structure also encircling said tubing end clamped between said nut and said abutment and contacting with said depression within the socket and with the clamping edge at the end of the nut, such contacting surfaces being so constructed and arranged that the sleeve structure will resist turning with greater effect due to its contact with the mounting structure than it will tend to turn due to its contact with the rotated nut, the contacting conical depression and the coupling sleeve taper being of substantially the same angularity while the contacting nut bevel and other coupling sleeve taper are of substantially different angularity and outwardly divergent.

6. A tubing terminal arrangement comprising a mounting structure provided with a bore, the outer portion of which is provided with an abutment for the tubing end, with an outwardly divergent conical depression and a threaded portion, a tubing end abutting against said abutment and passing through said threaded portion and said conical depression, a threaded nut screwed to said threaded portion encircling said tubing end and having at its inner end a clamping edge and a double tapered coupling sleeve structure also encircling said tubing end clamped between said nut and said abutment and contacting with said depression within the socket and with the clamping edge at the end of the nut, such contacting surfaces being so constructed and arranged that the sleeve structure will resist turning with greater effect due to its contact with the mounting structure than it will tend to turn due to its contact with the rotated nut, the cooperating tapers, conical depression and clamping edge contacting closely adjacent to the tubing wall which they encircle.

7. A tubing terminal arrangement comprising a mounting structure provided with a bore, the outer portion of which is provided with an abutment means for the tubing, with an outwardly divergent conical depression means and a threaded connection associated with said mounting structure, a tubing end stopped against said abutment means and passing through said threaded connection and said conical depression means, a threaded nut screwed to said threaded connection encircling said tubing end and having at its inner end a clamping edge and a double tapered coupling sleeve also encircling said tubing end, clamped between said nut and said abutment means and contacting with said conical depression means and with the clamping edge at the end of the nut, such contacting surfaces being so constructed and arranged that the sleeve will resist turning with greater effect due to its contact with the mounting structure than it will tend to turn due to its contact with the rotated nut, the effective radius of contact between the clamping edge and coupling sleeve being substantially less than the effective radius of contact between the conical depression means and the coupling sleeve, whereby during the assembly operation the coupling sleeve is maintained substantially rigid with the mounting structure by wedging with the conical depression means and is crimped against the tubing end.

8. Means for coupling tubing and a fitting of relatively soft metallic material, said fitting being provided with a bored and threaded annular nipple portion, the outer part of which nipple portion is provided with a thimble of relatively resistant material having an abutment means to contact with said fitting and a depression means, a double tapered coupling sleeve encircling said tubing and having one end mating said depression means in said thimble, a coupling nut engaging the other end of said coupling sleeve, said nut when threaded upon said nipple portion wedging said coupling sleeve between said nut and said thimble so that the inner and outer ends of the coupling sleeve are deformed inwardly to grip the pipe.

9. In a conduit system for a lubricating installation, in combination, a mounting structure provided with a bored and threaded nipple of soft metal, the outer portion of which bore is enlarged, a hard metal cylindrical thimble fitted into said enlargement and provided with an annular clamping portion adjacent its outer end, a pipe end inserted into said thimble and enlargement and stopped thereby, a tapped cap nut encircling said pipe end and screwed upon said threaded nipple and a tapered coupling sleeve means between said cap and said thimble within said tapped cap cavity.

10. In a conduit system for a lubricting installation, in combination, a mounting structure provided with a bored and threaded nipple of soft metal, the outer portion of which bore is enlarged, a hard metal cylindrical thimble fitted into said enlargement and provided with an annular clamping portion adjacent its outer end, a pipe end inserted into said thimble and enlargement and stopped thereby, a tapped cap nut encircling said pipe end and screwed upon said threaded nipple and a tapered coupling sleeve means between said cap and said thimble within said tapped cavity, in which the thimble is provided with an abutment shoulder against which said pipe end abuts.

11. In a conduit system for a lubricting installation, in combination, a mounting structure provided with a bored and threaded nipple, the outer portion of which bore is enlarged, a cylindrical thimble fitted into said enlargement and provided with an annular clamping portion adjacent its outer end, a pipe end inserted into said thimble and enlargement, and stopped thereby, a tapped cap nut encircling said pipe end and screwed upon said threaded nipple and a tapered coupling sleeve means between said cap and said thimble within said tapped cap cavity, in which the nipple, coupling means and cap are of brass, while the thimble is of steel.

EDWARD H. KOCHER.